United States Patent
Woods, Jr. et al.

(10) Patent No.: US 12,373,690 B2
(45) Date of Patent: Jul. 29, 2025

(54) TARGETED CROWD SOURCING FOR METADATA MANAGEMENT ACROSS DATA SETS

(71) Applicant: AT&T Intellectual Property I, L.P., Atlanta, GA (US)

(72) Inventors: Robert Woods, Jr., Plano, TX (US); Mark D. Austin, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/183,111

(22) Filed: Mar. 13, 2023

(65) Prior Publication Data

US 2023/0222341 A1 Jul. 13, 2023

Related U.S. Application Data

(63) Continuation of application No. 16/419,651, filed on May 22, 2019, now Pat. No. 11,604,980.

(51) Int. Cl.
  *G06N 3/08* (2023.01)
  *G06F 16/23* (2019.01)
  *G06Q 10/0631* (2023.01)

(52) U.S. Cl.
  CPC ........... *G06N 3/08* (2013.01); *G06F 16/2365* (2019.01); *G06Q 10/063112* (2013.01)

(58) Field of Classification Search
  CPC .................. G06N 3/08; G06F 16/2365; G06Q 10/063112

(Continued)

(56) References Cited

U.S. PATENT DOCUMENTS 6,879,967 B1 4/2005 Stork
7,945,470 B1 * 5/2011 Cohen ..................... G06F 16/27
                                                      455/433

(Continued)

FOREIGN PATENT DOCUMENTS

CN   104778173 A  *  7/2015  ............. G06Q 10/10
CN   108829763 A     11/2018

(Continued)

OTHER PUBLICATIONS

Roli, "Semi-Supervised Multiple Classifier Systems: Background and Research Directions", Dept. of Electrical and Electronic Engineering, University of Cagliari, 2014, 10 pages.

(Continued)

*Primary Examiner* — Phuong Thao Cao

(57) ABSTRACT

A system includes: a memory operable to store a predictive model; a first processor communicatively coupled to the memory, the first processor operable to execute the predictive model to perform operations including generating knowledge score metrics based on a set of attributes for individuals included in a specified population, where the knowledge score metrics quantify a prediction of a capability of an individual for performing metadata labeling; a second processor communicatively coupled to the memory and the first processor, the second processor is operable to perform operations including comparing the knowledge score metrics to a specified threshold, and identifying attributes of individuals from a specified population having knowledge score metrics exceeding the specified threshold as attributes of individuals capable of performing metadata labeling.

20 Claims, 4 Drawing Sheets

(58) Field of Classification Search
USPC .......................................................... 706/18
See application file for complete search history.

(56) References Cited

U.S. PATENT DOCUMENTS

| | | | |
|---|---|---|---|
| 8,027,939 B2 | 9/2011 | Fung et al. | |
| 8,265,977 B2* | 9/2012 | Scarborough | G06Q 10/0639 705/7.17 |
| 8,527,432 B1 | 9/2013 | Guo et al. | |
| 8,805,756 B2 | 8/2014 | Boss et al. | |
| 8,825,561 B2 | 9/2014 | Bellamy et al. | |
| 9,070,085 B2 | 6/2015 | Arseneault et al. | |
| 9,135,573 B1 | 9/2015 | Rodriguez et al. | |
| 9,342,796 B1 | 5/2016 | McClintock et al. | |
| 9,396,439 B2 | 7/2016 | Ebadollahi et al. | |
| 9,461,876 B2 | 10/2016 | Van Dusen et al. | |
| 9,626,628 B2 | 4/2017 | Dasgupta et al. | |
| 9,703,823 B2 | 7/2017 | Daly et al. | |
| 10,002,330 B2 | 6/2018 | Kulkarni et al. | |
| 10,540,607 B1* | 1/2020 | Oldridge | G06N 20/00 |
| 10,592,806 B1* | 3/2020 | Kannan | G06Q 10/0639 |
| 10,733,556 B2* | 8/2020 | Bencke | G06Q 10/0633 |
| 11,107,292 B1* | 8/2021 | Little | G06T 19/003 |
| 11,120,480 B2 | 9/2021 | Agost et al. | |
| 11,308,364 B1 | 4/2022 | Herman et al. | |
| 11,386,442 B2* | 7/2022 | Lahav | G06Q 30/0204 |
| 12,106,239 B1* | 10/2024 | Perry | G06Q 10/063112 |
| 2002/0174008 A1* | 11/2002 | Noteboom | G06Q 10/10 705/7.14 |
| 2010/0049574 A1* | 2/2010 | Paul | G06Q 10/063112 705/7.14 |
| 2012/0110071 A1 | 5/2012 | Zhou et al. | |
| 2013/0152091 A1* | 6/2013 | Liu | G06Q 10/06 718/102 |
| 2013/0290207 A1* | 10/2013 | Bonmassar | G06Q 10/1053 705/321 |
| 2014/0149507 A1* | 5/2014 | Redfern | G06Q 50/01 709/204 |
| 2015/0317564 A1 | 11/2015 | Chen et al. | |
| 2016/0055010 A1* | 2/2016 | Baird | G06F 16/9535 707/727 |
| 2017/0220952 A1 | 8/2017 | Baughman et al. | |
| 2017/0293859 A1 | 10/2017 | Gusev et al. | |
| 2017/0316514 A1 | 11/2017 | Huang et al. | |
| 2017/0323233 A1* | 11/2017 | Bencke | G06Q 10/0633 |
| 2017/0344899 A1 | 11/2017 | Zimmerman et al. | |
| 2018/0001206 A1 | 1/2018 | Osman et al. | |
| 2018/0039910 A1 | 2/2018 | Hari Haran et al. | |
| 2018/0046938 A1 | 2/2018 | Allen et al. | |
| 2018/0082211 A1 | 3/2018 | Allen et al. | |
| 2018/0253664 A1 | 9/2018 | Rabenoro et al. | |
| 2018/0268319 A1 | 9/2018 | Guo et al. | |
| 2018/0365592 A1 | 12/2018 | Gu et al. | |
| 2019/0034883 A1 | 1/2019 | Liang et al. | |
| 2019/0102681 A1* | 4/2019 | Roberts | G06N 20/00 |
| 2019/0102693 A1 | 4/2019 | Yates et al. | |
| 2019/0251457 A1* | 8/2019 | Byrnes | H04L 67/566 |
| 2020/0005214 A1* | 1/2020 | Kulkarni | G06F 18/2113 |
| 2020/0104777 A1* | 4/2020 | Bouhini | G06Q 10/063112 |
| 2020/0151641 A1* | 5/2020 | Avegliano | G06Q 10/06316 |
| 2020/0211041 A1* | 7/2020 | Raudies | G06Q 30/0206 |
| 2020/0302368 A1* | 9/2020 | Mathiesen | G06N 5/02 |
| 2020/0302398 A1 | 9/2020 | Wali et al. | |
| 2020/0342409 A1 | 10/2020 | Jang | |
| 2020/0372090 A1* | 11/2020 | Markman | G06F 16/9535 |
| 2021/0073737 A1* | 3/2021 | Flynn | G06N 5/04 |

FOREIGN PATENT DOCUMENTS

| | | | | |
|---|---|---|---|---|
| CN | 109388674 A | | 2/2019 | |
| EP | 2863351 A1 | * | 4/2015 | ....... G06F 16/24578 |
| RU | 2632143 C1 | | 10/2017 | |
| WO | WO-9505649 A1 | * | 2/1995 | .......... G01S 13/325 |
| WO | 2010080722 A2 | | 7/2010 | |
| WO | 2012166660 A2 | | 12/2012 | |
| WO | 2014136316 A1 | | 9/2014 | |
| WO | 2014144587 A2 | | 9/2014 | |
| WO | 2017052942 A1 | | 3/2017 | |

OTHER PUBLICATIONS

Pal et al., "Evolution of Experts in Question Answering Communities", Proceedings of the Sixth International AAAI Conference on Weblogs and Social Media, Department of Computer Science, University of Minnesota, 2012, 8 pages,.

Mahapatra et al., "Combining Multiple Expert Annotations Using Semi-Supervised Learning and Graph Cuts For Crohn's Disease Segmentation", International MICCAI Workshop on Computational and Clinical Challenges in Abdominal Imaging, Springer, Cham, 2014, 9 pages.

Barbuzzi et al., "About restraining rule in multi-expert intelligent system for semi-supervised learning using SVM classifiers", International Journal of Signal and Imaging Systems Engineering, vol. 7, No. 4, Dec. 2014, 8 pages.

* cited by examiner

TARGETED CROWD SOURCING FOR METADATA MANAGEMENT ACROSS DATA SETS

This application is a continuation of U.S. patent application Ser. No. 16/419,651, filed on May 22, 2019, now U.S. Pat. No. 11,604,980, which is herein incorporated by reference in its entirety.

BACKGROUND

Unless otherwise indicated herein, the materials described in this section are not prior art to the claims in this application and are not admitted to be prior art by inclusion in this section.

Many companies amass large amounts (e.g., petabytes) of digital data. In some cases, various groups may copy and apply originally generated data to many different applications. As a result, many partial or full replications of data sets may be generated so that only a small portion of the total data is unique. To make the data useful to the various groups, the data should be described from a technical as well as an operational point of view.

This description of the data itself is typically referred to as "metadata." Obtaining an accurate picture of the metadata and keeping the metadata updated is a challenge faced by companies. Often, accurate descriptions, i.e., accurate metadata, may be unavailable due to, for example, mislabeling of the data or lack of qualified individuals to perform the metadata labeling. Existing approaches of identifying metadata managers that are responsible for populating and checking the metadata typically fail to provide for checking the quality of the metadata labeling or whether the metadata labeling is correct.

SUMMARY

Systems and methods for a machine learning neural network for identifying individuals capable of accurately labeling data with metadata are provided.

According to various aspects there is provided a method. In some aspects, the method may include: forming a machine learning model operable on a neural network processor in a computing environment, the machine learning model configured to analyze input data including a set of attributes to predict analytical capabilities of a set of individuals for performing a specific task; operating the neural network processor to execute the machine learning model, where the machine learning model generates knowledge score metrics for the set of individuals, and the knowledge score metrics quantify a prediction of an analytic capability of each individual in the set of individuals for performing the specific task; comparing, by a second processor in the computing environment, the knowledge score metrics to a specified threshold; identifying, by the second processor, attributes of individuals from the set of individuals having knowledge score metrics exceeding the specified threshold as attributes of individuals capable of performing the specific task; and receiving, as additional input to the machine learning model, data related to performance of the specific task by each of the individuals having the identified attributes. The specific task may include analyzing a data set and, based on analyzing the data set, generating metadata labels for data in the data set.

The set of attributes may include demographic data, education data, or data regarding a role within a company, and may indicate a degree of familiarity with a given data set. The set of individuals may include people within a company that meet specified minimum criteria. The specified threshold for the knowledge score metrics may be based on the knowledge score metrics of a seed set of experts.

The method may further include requesting individuals having the identified attributes to perform metadata labeling, assessing accuracy of the metadata labeling performed by the individuals, updating the metadata when the accuracy of the metadata labeling is assessed as accurate, and/or updating the machine learning model for the identified individuals based on the accuracy of the metadata labeling. Updating the machine learning model may include adjusting weights of attributes determined to be beneficial or less relevant for performing metadata labeling.

According to various aspects there is provided a method for generating seed input for an artificial intelligence (AI) system. In some aspects, the method may include: collecting information on a set of attributes for each individual in an initial set of individuals; assessing a quality of a metadata labeling task performed by each individual in the initial set of individuals; evaluating, by a processor of the AI system, the set of attributes and assessed quality of the metadata labeling; based on results of an evaluation, associating quality metrics with the collected information on the set of attributes for each individual in the set of initial individuals; comparing, by the processor of the AI system, the quality metrics to a threshold; in response to determining that a quality metric exceeds the threshold, identifying, by the processor of the AI system, the set of attributes associated with the quality metric as attributes of an expert with respect to a type of data in a given data set; and inputting the set of attributes to a neural network processor to seed the AI system to identify experts.

The method may further include: in response to determining that a quality metric does not exceeds the threshold, inputting, to the neural network processor, the set of attributes in a hold out set of training data for the AI system. The quality of the metadata labeling may include an assessed degree of accuracy in defining an operational definition of elements of a given data set.

The set of attributes may include demographic data, education data, or data regarding a role within a company, and the set of attributes may indicate a degree of familiarity with a given data set. The metadata may include both a technical description of data in a given data set and an operational description of data in a given data set.

The method may further include identifying training data for a plurality of different machine learning models. Each of the plurality of different machine learning models may be trained based on training data identified for a different type of data set.

According to various aspects there is provided a system. In some aspects, the system may include: a memory operable to store a predictive model; a first processor communicatively coupled to the memory, the first processor operable to execute the predictive model to perform operations including generating knowledge score metrics based on a set of attributes for individuals included in a specified population, where the knowledge score metrics quantify a prediction of a capability of an individual for performing metadata labeling. The system may further include a second processor communicatively coupled to the memory and the first processor, the second processor is operable to perform operations including comparing the knowledge score metrics to a specified threshold, and identifying attributes of individuals from a specified population having knowledge score metrics exceeding the specified threshold as attributes of individuals capable of performing metadata labeling.

The set of attributes may include one or more of demographic data, education data, or data regarding a role within a company, and may indicate a degree of familiarity with a given data set. The specified threshold for the knowledge score metrics may be based on knowledge score metrics of a seed set of experts.

The second processor may be further operable to perform operations including generating requests to individuals having the identified attributes to perform metadata labeling. The first processor may be further operable to perform operations including receiving as input an assessment of accuracy of the metadata labeling performed by the individuals, and updating the predictive model for the individuals based on accuracy of the metadata labeling. The second processor may be further operable to perform operations including updating the predictive model by adjusting weights of attributes determined by the predictive model to be beneficial or less relevant for performing metadata labeling.

Numerous benefits are achieved by way of the various embodiments over conventional techniques. For example, the various embodiments provide methods and systems that can be used to increase metadata labeling quality and develop additional data insights by forming an expert list, automatically identifying additional qualified individuals, grading the quality of the identification process, and incorporating user feedback on overall quality of the expert list. The described embodiments may also be used to create a "database of experts" that may be identified for collaboration opportunities. These and other embodiments along with many of their advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

Figure 1:
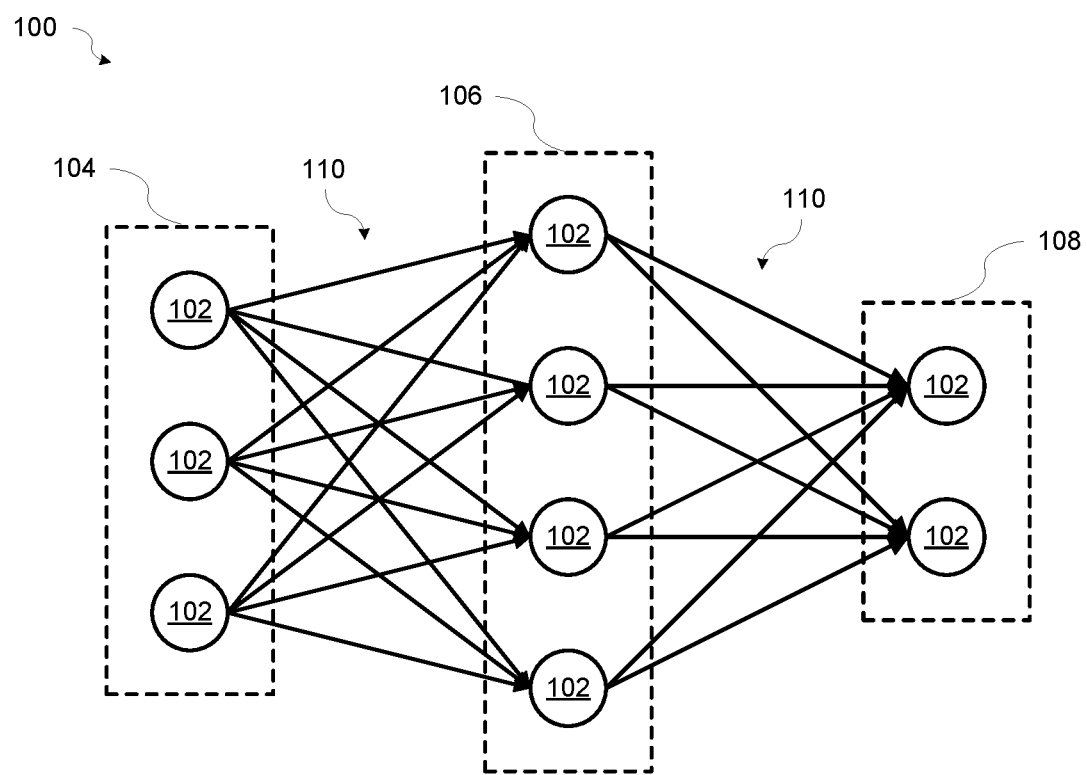
FIG. 1 illustrates an example of visual model for a neural network according to various aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In accordance with various aspects of the present disclosure, systems and methods for targeted crowd sourcing for metadata labelling are provided. Metadata is data that describes other data. It is a description and context of the data. Data has at least two relevant definitions associated with it: a technical definition that describes the type of data and the format of the data; and an operational definition that describes the data in terms of its subject matter. Different types of data may be generated from different sources. For example, network performance data may be generated by an engineering group, while marketing data may be generated by a sales and marketing group. The format for the engineering data may be primarily numeric and the marketing data may be formatted as sentences. Relationships between data expressed in different formats may be identified based on the operational definitions. Metadata consists of properties, which describe entities and their values in a data set. Thus, metadata summarizes basic information about data, which can make finding and working with particular instances of data easier. For example, author, date created and date modified, and file size are examples of very basic document metadata.

Metadata labelling is the process of creating descriptions of data in a data set and labeling the data with the descriptions. Metadata labeling is largely a manual process conducted by experts in the fields in which the data sets are generated. An expert as referred to herein is an individual possessing sufficient knowledge regarding the subject matter of a given data set to accurately describe (e.g., provide metadata for) some or all portions of the data in the given data set. One or more experts may review the data in a data set and, based on their knowledge and experience, create metadata that describes the data in the data set. For example, with respect to mobile device data usage plans, a data set may be a column identifying the package/product identification (ID). The "unlimited data" metadata may be applied to all plans in the data set having unlimited data even though they may have different package/product IDs.

While some metadata may be created by machine analysis, more accurate characterization of the data contained in a data set can be performed by human analysis, making the metadata more useful in identifying and applying the data in various applications. Accurate metadata labeling can make the large amounts of data useful for making decisions. To accurately label the data, subject matter experts (SMEs) in appropriate areas should be identified. Machine learning technology has applicability for companies needing to characterize large amounts of data, for example, by metadata labeling of the data. Using qualifications and historical performance of a pool of experts as input to the artificial intelligence (AI) or machine learning system, for example a neural network, may help to identify experts in various fields capable of generating accurate metadata for data sets within their areas of expertise.

Various aspects of the present disclosure describe an AI system and method that provides a targeted crowd-sourcing approach to assist in identifying experts for labeling or populating metadata across diversely owned and operated data sets within a company's vast set of data sources. The AI system may derive a "knowledge score per person per data set," also referred to herein as a knowledge score metric, to identify likely experts on various data sets or elements within data sets. The knowledge score metric may be a measure of a given expert's ability to accurately perform metadata labeling on a given data set, e.g., the knowledge score metric may quantify a prediction of an analytic capability of a given expert for performing a specific task. A trained machine learning model may derive knowledge score metrics for a population of potential subject matter experts, for example, but not limited to, company employees meeting certain criteria such as at least a minimum level of experience or other criteria.

For those data sets that do not have sufficient operational knowledge populated for the metadata, individuals with knowledge score metrics higher than a specified threshold may be identified to assist in populating the metadata for the data sets. The success or lack of success of the metadata labeling by each individual may be fed back into the machine learning model to create a closed loop AI system that may receive continued training to predict "knowledge score per person per data set" for various data sets.

FIG. 1 illustrates visual model 100 for an example neural network according to various aspect of the present disclosure. A neural network processor may execute a neural network model. A neural network model may also be referred to herein as a machine learning model. Referring to FIG. 1, the model 100 includes an input layer 104, a middle layer (i.e., a "hidden" layer) 106, and an output layer 108. In general, a neural network implementation can include multiple hidden layers. Each layer includes some number of nodes 102. The nodes 102 of the input layer 104 may be connected to each node 102 of the hidden layer 106. The connections may be referred to as weights 110. Each node 102 of the hidden layer 106 may have a connection or weight 110 with each node 102 of the output layer. The input layer 104 can receive inputs and can propagate the inputs to the hidden layer 106. Weighted sums computed by the hidden layer 106 (or multiple hidden layers) are propagated to the output layer 108, which can present final outputs to a user.

One of ordinary skill in the art will appreciate that neural network illustrated in FIG. 1 is merely exemplary and that different and/or additional neural networks, for example, but not limited to, Long Short Term Memory (LSTM) neural networks, feedforward neural network, radial basis function neural network, or other types of neural networks, may be used without departing from the scope of the present disclosure.

Training a machine learning model refers to the process of preparing a machine learning model to be useful by feeding it data from which it can learn. In accordance with various aspects of the present disclosure, different neural network models may exist to identify experts in different subject matter areas. Initial training of the neural network may be accomplished by seeding a machine learning model with input including characteristics/attributes of an identified set of experts for given data sets.

Seeding of machine learning models to enable the AI system to derive knowledge score metrics may be done by inputting characteristics of a set of identified experts for given data sets. The set of experts may be identified, for example, by opinions of others, or by issuing a survey to a set of individuals and determining which experts can answer some of the metadata questions for a set of data sources. Once a set of experts is identified, data associated with characteristics and/or attributes of each expert is collected. The characteristics and/or attributes may indicate a degree of familiarity with a given data set and may be relevant to the ability of an expert to accurately label data with metadata. The collected data about the experts may be, for example, but not limited to:

Demographic and education data (e.g., age, highest educational degree, degree type, etc.).

Role data (e.g., business unit, position level, position title (e.g., data scientist, developer, etc.), tenure at company, tenure in field, tenure in business unit, etc.).

Data accesses (e.g., number of times data sets accessed, number of derived data sets as a function of the data set, time data last accessed, number of total data sets accessed, number of unique elements accessed in data set, number of unique elements accessed in all data sets, etc.).

Code metrics (number of lines of code checked-in, etc.).

One of ordinary skill in the art will appreciate that the above list of collected data is not exhaustive and that other data related to the set of identified experts may be collected without departing from the scope of the present disclosure.

The data related to each expert may be associated with an assessment of the accuracy with which each expert performs metadata labeling. An accurate assessment may be performed, for example, by having each expert perform metadata labeling on a given data set within their area of expertise. The metadata labeling may then be assessed by current subject matter experts responsible for maintaining the data sets. For example, the current subject matter experts may be data stewards having a high degree of familiarity with the technical and operational aspects of the data sets. An accuracy score for the metadata labeling performed by each expert may be assigned by the data stewards.

In some implementations, the accuracy score may be a binary indication (e.g., accurate/inaccurate, good/bad, etc.). In some implementations, the accuracy score may additionally or alternatively include a qualitative assessment indicating a degree of accuracy of the individual's metadata labeling performance. The accuracy score may be associated with the collected data of each expert.

The seed input to the machine learning model may include the collected data and accuracy scores of each of the experts. Based on the seed input, the machine learning model may be trained to predict the experts in the set of identified experts by generating a knowledge score metric (i.e., a "knowledge score per person per data set") to quantify a prediction of an analytic capability of each expert in the set of identified experts for performing the specific task, in this case, metadata labeling. An expert may be predicted by the AI system when, for example, the machine learning model generates a knowledge score metric (i.e., a "knowledge score per person per data set") exceeding a specified threshold for an individual. Training of the machine learning model may be considered complete when the model predicts the experts in the initial set of individuals with a specified degree of accuracy, for example, 70% accuracy or another accuracy measure. The accuracy measure of the AI system in predicting the experts during training of the machine learning model may be based on sets of attributes of a "hold out" set of individuals from a larger set of training data, or by another method, for example, but not limited to, cross-validation. The hold out set of individuals may have at least some of the characteristics/attributes of the experts in the set of identified experts.

One of ordinary skill in the art will appreciate that other methods of training machine learning model may be used without departing from the scope of the present disclosure. For example, rather than identifying a set of experts and assessing the accuracy of the identified set of experts in performing metadata labeling, certain general and/or specific attributes that indicate a degree of familiarity with a given data set may be identified that are predictive of an individual's expertise and ability to fill out the metadata for a given data source. The seed input to the machine learning model may then include the identified attributes. One of ordinary skill in the art would recognize many variations, modifications, and alternatives.

Figure 2:
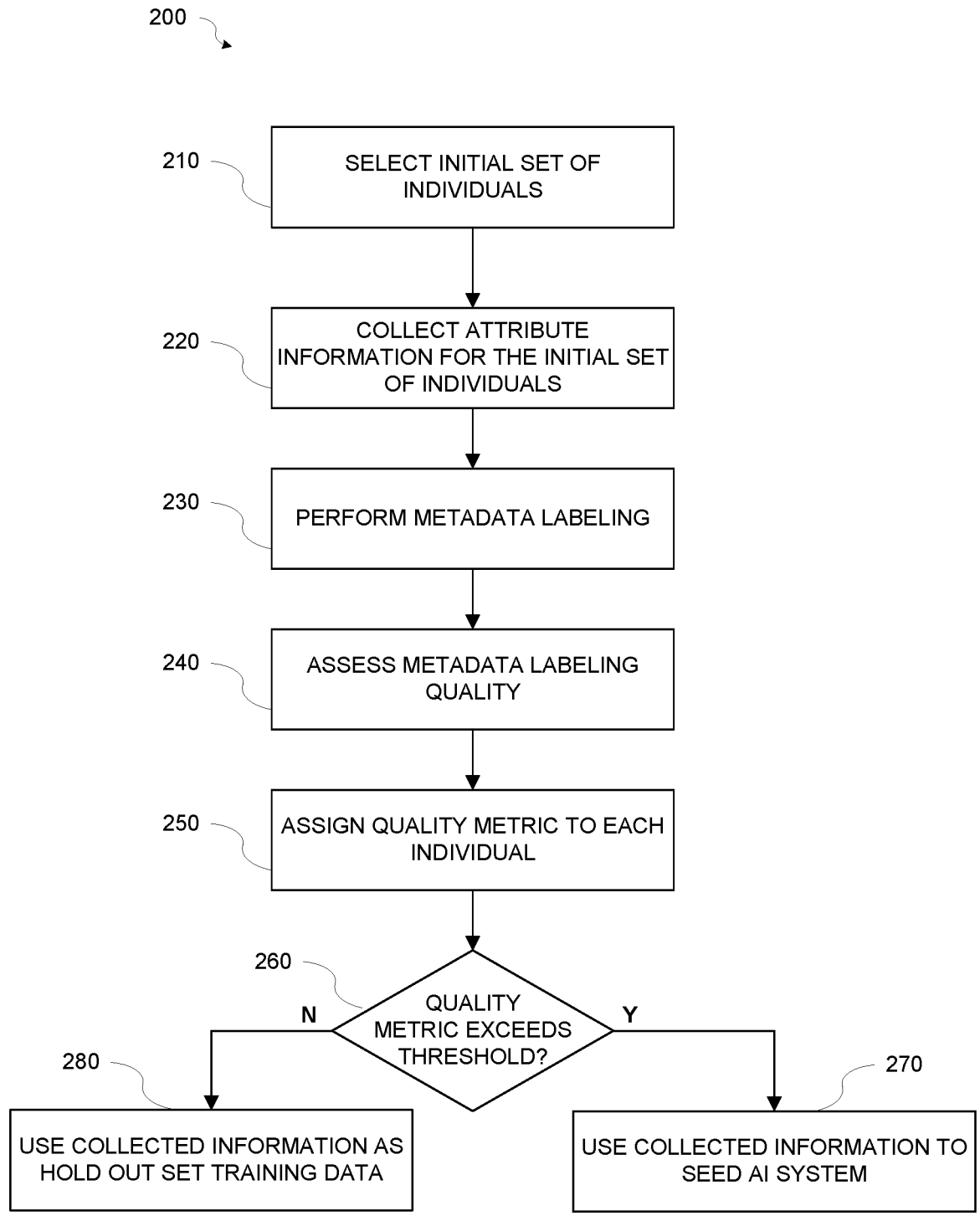
FIG. 2 is a flowchart illustrating a method for generating seed input for an artificial intelligence (AI) system according to various aspects of the present disclosure.

FIG. 2 is a flowchart illustrating a method 200 for generating seed input for an AI system according to aspects of the present disclosure. Referring to FIG. 2, at operation 210, an initial set of individuals may be selected to label a given data set with metadata. For example, the set of individuals may be selected based on, for example, opinions of others, or results of a survey to determine which experts can answer some metadata questions for a set of data sources.

At operation 220, information on a set of attributes may be collected for each individual in the initial set of individuals. Information may be collected on the initial set of individuals by, for example, issuing a survey designed to collect the data. One of ordinary skill in the art will appreciate that other methods of collecting information may be used. The collected data may be relevant to the ability of an individual to accurately label data with metadata. The collected data may include, for example, but not limited to, attributes related to demographics and education, role within the company, frequency and type of data accessed by the individual, etc.

At operation 230, each individual in the initial set of individuals may perform metadata labeling for the given data set. The type of data in the given data set, for example, test data, sales data, etc., may be related to an area of expertise of each individual as determined by the collected data. Thus, the given data set may be the same or different types of data for each individual.

At operation 240, the quality of the metadata labeling for each individual in the initial set of individuals may be assessed. The quality of the metadata labeling may be assessed, for example, by data stewards having a high degree of familiarity with the technical and business-sense aspects of the data sets. An accuracy score for the metadata labeling performed by each individual in the initial set of individuals may be assigned by the data stewards based on the assessments. The accuracy score may be a binary indication (e.g., accurate/inaccurate, good/bad, etc.) and may or may not include a qualitative assessment indicating a degree of accuracy of the individual's metadata labeling performance.

At operation 250, based on an evaluation of the set of attributes and the quality of the metadata labeling, a quality metric (i.e., a "knowledge score per person per data set") may be associated with the set of attributes of each individual in the set of initial individuals. At operation 260, a threshold may be applied to the quality metric associated with the set of attributes for each individual in the initial set of individuals. Each individual in the initial set of individuals having a set of attributes with a quality metric exceeding the threshold (260-Y) may, at operation 270, be identified as an expert with respect to the type of data, for example, test data, sales data, etc., the metadata labeling was performed on. The collected information on those individuals identified as experts may be used to seed the AI system to identify experts. Characteristics of individuals having sets of attributes with quality metrics that do not exceed the threshold (260-N) may, at operation 280, be used as part of a hold out set of training data for the AI system.

It should be appreciated that the specific steps illustrated in FIG. 2 provide a particular method for generating seed input for an AI system according to an embodiment. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

After a machine learning model is trained to predict the experts in the set of identified experts in the initial set of individuals, for example, by generating a knowledge score metric above a predetermined threshold for all or most of the set of identified experts, the machine learning model may be used to process data collected on a larger population. The population may include other company employees meeting certain minimum criteria, for example, but not limited to, length of time employed by the company, job title, or other criteria. In some cases, the population may include other individuals from outside the company.

Similar to the process of identifying the experts for the seed input, the machine learning model may be executed to process the collected data on the larger population to identify additional experts based on their characteristics/attributes and accuracy of metadata labeling. For example, information may be collected on the individuals meeting the minimum criteria by, for example, issuing a survey designed to collect demographic and education data, role data, information on data that has been accessed, and/or other criteria. The collected data may be input to the machine learning model, and the model may be executed to identify additional individuals having similar characteristics/attributes as any of the initially identified seed set of experts. Knowledge score metrics similar to the knowledge score metrics of the seed set of experts may be associated with the characteristics/attributes of individuals identified by the AI system as similar to any of the seed set of experts. Individuals having knowledge score metrics that exceed a specified threshold may be identified as experts.

In accordance with various aspects of the present disclosure, metadata labeling may be "crowd sourced." When data sets are to be labeled with metadata, labeling requests may be made and logged to individuals identified by the AI system as having knowledge score metrics (i.e., a "knowledge score per person per data set") that exceed a specified threshold to request that the individuals provide input on metadata, e.g., perform metadata labeling, for data sets within their identified areas of expertise. In some cases, multiple individuals may be requested to provide input (e.g., metadata labeling) for the same data set so as to compare the metadata and/or to extract additional information from the data set.

In some implementations, the AI system, for example, a CPU or other general purpose processor, may generate the labeling requests, for example, based on newly received data sets that require metadata labeling or based on other criteria. In some implementations, the labeling requests may be made by company personnel, for example, but not limited to a data steward or manager. Some of the attributes of a data set that the metadata labeling may populate are:

Description: a description of a field, including units of an attribute.
Operational application of field: a description from an operational perspective.
Frequency: update frequency of a field.
Original data source: an indication that data comes from an original source or another source.
Application: how the data source is used.
Sensitivities: privacy label, e.g., customer specific private data.
Similarities: identification of other similar data sources.

One of ordinary skill in the art will appreciate that the above list of attributes is not exhaustive and that other data attributes may be labeled with metadata without departing from the scope of the present disclosure.

Results of the metadata labeling by individuals responding to the metadata labeling requests may be assessed, for example, by data stewards responsible for maintaining the data sets. The data stewards may have a high degree of familiarity with the technical and operational aspects of the data sets. The results of each metadata labeling performance may be logged and associated with the individual performing the metadata labeling. For example, a result of a labeling performance may include a binary response such as "the request resulted in update to the metadata" or "the request did not result in update to the metadata." Alternatively or additionally, results of a labeling request may include a quality attribute related to the quality of an update to the metadata.

The AI system may learn to better predict which individuals to target as experts by further training the machine learning models with additional input from the logged metadata labeling results. In some implementations, further input may be collected from "users" of the metadata. For example, users of the metadata may provide information regarding the usefulness of the metadata and/or whether further metadata labeling of the data could be provided. A metadata quality metric for the metadata labeling may be generated based on the information provided by the users and may be input into the machine learning model as additional training input.

The additional training input provided by results of the metadata labeling requests and metadata quality metrics generated by user feedback may be used further improve the quality of predicting experts. For example, the additional training input may modify the "knowledge score per person per data set" for some experts and/or identify additional characteristics/attributes for experts that may be beneficial for performing metadata labeling for given data sets or identify characteristics/attributes of experts that may be irrelevant for metadata labeling of given data sets. The described approach may also be used to create a "database of experts" that may identify experts for collaboration opportunities within the company.

Feedback from users of the metadata may also be used to determine whether additional metadata updates for given datasets should be performed. For example, users of the metadata may provide feedback that metadata for a given data set is incomplete or inaccurate. Additionally or alternatively, data stewards may note incomplete or inaccurate metadata labeling results. For example, for data sets related to various mobile device data plans, a submission of "unlimited data" metadata may be applied to a data set that includes information on something other than subscriber data by one expert while another expert metadata submission may be simply "unlimited." A data steward may select the "unlimited" metadata to describe the data, but based on user feedback, additional expert submissions may be requested and the results may cause the metadata to be updated to "unlimited data."

If additional metadata updates are needed, the AI system may again predict the appropriate experts to perform the metadata labeling based on the machine language model that has been updated based on previous results of metadata labeling requests and metadata quality metrics, and new metadata labeling requests may be generated. Thus, in addition to improving the quality of the AI system for predicting appropriate experts to perform metadata labeling for various data sets, the metadata labeling itself may be improved.

Figure 3:
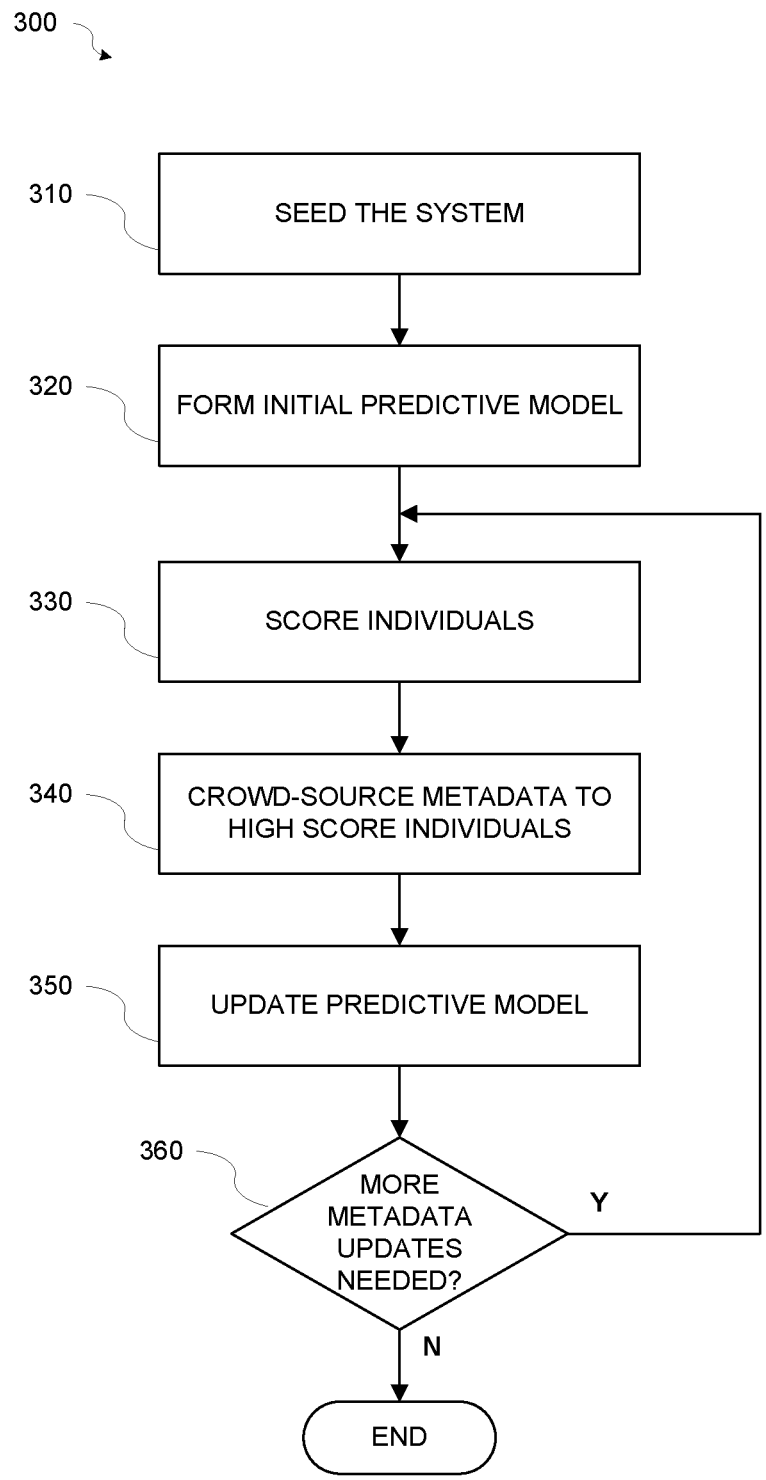
FIG. 3 is a flowchart illustrating a method for training an AI system to identify individuals capable of performing metadata labeling according to various aspects of the present disclosure.

FIG. 3 is a flowchart illustrating an example method 300 for training an AI system to identify individuals capable of performing metadata labeling according to aspects of the present disclosure. Referring to FIG. 3, at operation 310, the AI system may be seeded. Training data to seed the AI system may be generated, for example, by the processes described with respect to FIG. 2. The AI system may be seeded with characteristics of people that are believed to be good examples of individuals capable of performing metadata labeling (e.g., experts) on a given data set or elements within the given data set and who can perform metadata labeling. The set of experts may be identified, for example, by opinions of others, by issuing a survey to a set of individuals, or by other means. Once a set of experts is identified, data relevant to the ability of each expert to accurately label data with metadata may be collected. The data may include, for example, but not limited to demographic and education data, date regarding the expert's role within the company, data regarding previous data accesses by the expert, code metrics, etc.

The data of each expert may be associated with an assessment of the accuracy with which each expert performs metadata labeling, for example, by having each expert perform metadata labeling on a given data set within their area of expertise. The metadata labeling performed by the experts may be assessed by current subject matter experts, for example, data stewards having a high degree of familiarity with the technical and operational aspects of the data sets, and assigned an accuracy score. Additionally or alternatively, the accuracy score may include a qualitative assessment indicating a degree of accuracy of the individual's metadata labeling performance.

At operation 320, an initial predictive model may be formed. The machine learning model may be seeded by the collected data and accuracy scores of each of the experts to train the model to predict the experts in the set of identified experts. Training of the machine learning model may be performed based on, for example, but not limited to, a hold out set or cross validation. Training of the machine learning model may be considered complete when the model predicts the experts with a specified degree of accuracy. An expert may be predicted by the AI system when, for example, the machine learning model assigns a knowledge score metric (i.e., a "knowledge score per person per data set") exceeding a specified threshold. The knowledge score metrics may quantify a prediction of an analytic capability of an individual for performing the specific task, for example, metadata labeling.

One of ordinary skill in the art will appreciate that other methods of training machine learning model may be used without departing from the scope of the present disclosure. For example, rather than identifying a set of experts and assessing the accuracy of the identified set of experts in performing metadata labeling, certain attributes may be identified that are predictive of an individual's expertise in being able to fill out the metadata for a given data source. The seed input to the machine learning model may then include the identified attributes. One of ordinary skill in the art would recognize many variations, modifications, and alternatives.

At operation 330, after the machine learning model is trained to predict the experts, the model may be applied to data containing information about other individuals in a population to score the other individuals with a "knowledge score per person per data set." The population may include other company employees meeting certain minimum criteria, for example, but not limited to, length of time employed by the company, job title, or other criteria. In some cases, the population may include other individuals from outside the company.

Information may be collected on the individuals by, for example, issuing a survey designed to collect demographic in education data, role data, information on data that has been accessed, and/or other criteria. One of ordinary skill in the art will appreciate that other methods of collecting information may be used. The collected data may be input to the machine learning model, and the model may identify additional individuals having similar characteristics/attributes as any of the initially identified seed set of experts.

The AI system, for example, but not limited to, a neural network processor, may process the collected data, and knowledge score metrics may be generated and associated with the attributes of the individuals by the AI system. For example, the machine learning model may compare characteristics/attributes of individuals in the population to the characteristics/attributes of the identified set of experts to determine similarities and differences. The machine learning model may weigh the similarities and differences based on the learned importance of characteristics/attributes to accurately labeling data with metadata. Knowledge score metrics similar to the knowledge score metrics of the seed set of experts may be assigned to individuals identified by the AI system as similar to any of the seed set of experts. Individuals having knowledge score metrics that exceed a specified threshold, for example as determined by a central processing unit (CPU) or other general purpose processor of the AI system, may be identified as experts. The specified threshold may be based on the knowledge score metrics of the seed set of experts or on other criteria.

At operation 340, metadata labeling may be "crowd sourced" to individuals identified by the AI system as having knowledge score metrics (i.e., a "knowledge score per person per data set") that exceed a specified threshold. Metadata labeling requests may be made and logged to the individuals to perform metadata labeling for data sets within their identified areas of expertise. In some cases, multiple individuals may be requested to provide input (e.g., metadata labeling) for the same data set. In some cases, different individuals may be requested to perform metadata labeling of different data sets. In some implementations, the AI system, for example, a CPU or other general purpose processor, may generate the labeling requests, for example, based on newly received data sets that require metadata labeling or based on other criteria. In some implementations, the labeling requests may be made by company personnel, for example, but not limited to a data steward or manager.

At operation 350, the predictive model may be updated. For example, the machine learning model may be updated by updating the knowledge score metrics of the individuals identified as experts. Results of the metadata labeling requests by each individual may be assessed, for example, by data stewards having a high degree of familiarity with the technical and operational aspects of the data sets. The results of each labeling request may be logged and associated with the individual performing the metadata labeling. For example, a result of a labeling request may include a binary response such as "the request resulted in update to the metadata" or "the request did not result in update to the metadata." Alternatively or additionally, results of a labeling request may include a quality attribute related to the quality of an update. In addition, the AI system may identify additional characteristics/attributes for experts that may be beneficial for performing metadata labeling for given data sets or identify characteristics/attributes of experts that may be less relevant for metadata labeling of given data sets, and weights for the characteristics/attributes may be adjusted accordingly.

In addition, users of the metadata may provide information regarding the usefulness of the metadata and/or whether further metadata labeling of the data could be provided. A metadata quality metric for the metadata labeling may be generated based on the information provided by the users and may be input into the machine learning model as additional training input. The additional training input and metadata quality metrics may be used further improve the quality of the AI system in predicting experts. For example, the additional training input may modify the "knowledge score per person per data set" for some experts and/or identify additional characteristics/attributes for experts to perform metadata labeling for given data sets or identify characteristics/attributes that may be irrelevant for metadata labeling of given data sets.

At operation 360, it may be determined whether further metadata updates are needed for given data sets. Feedback from users of the metadata may be used to determine whether additional metadata updates for given datasets should be performed. In some cases, users of the metadata may provide feedback that metadata for a given data set is incomplete or inaccurate. Additionally or alternatively, data stewards may note incomplete or inaccurate metadata labeling results.

If it is determined that additional metadata updates are needed (360-Y), the AI system may return to operation 330 to again predict the appropriate experts to perform the metadata labeling based on the machine learning model that has been updated based on previous results of metadata labeling requests and metadata quality metrics, and new metadata labeling requests may be generated. Since the machine learning model is updated, the metadata labeling requests may be sent to the same experts, different experts, or a combination thereof. If it is determined that additional metadata updates are not needed (360-N), the process ends.

It should be appreciated that the specific steps illustrated in FIG. 3 provide a particular method for providing training data for a neural network model according to an embodiment. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
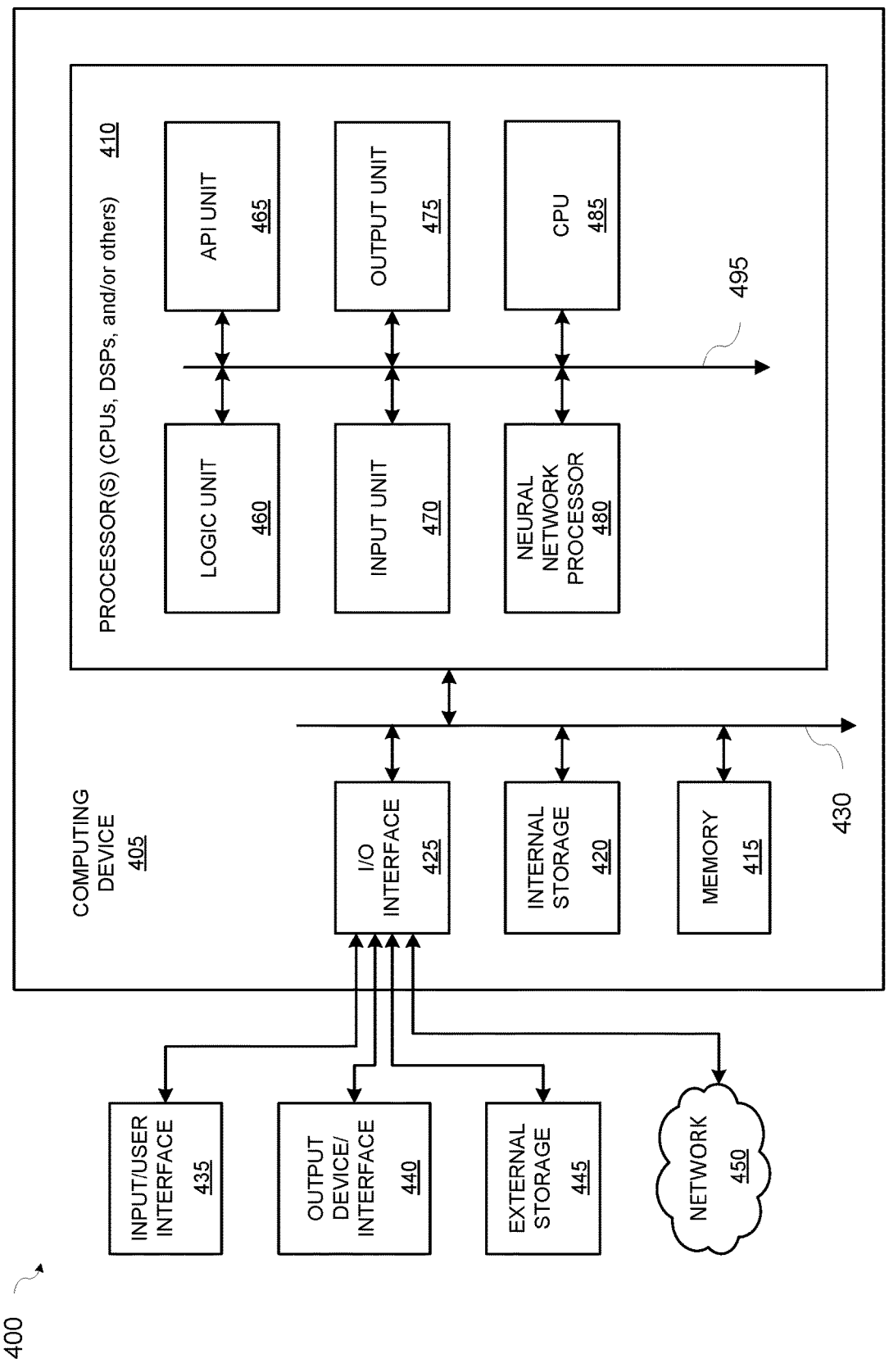
FIG. 4 is block diagram of an operating environment for an AI system according to various aspects of the present disclosure.

FIG. 4 is a block diagram of an example computing environment 400 with an example computing device in accordance with various aspects of the present disclosure. The example computing environment 400 may suitable for use in some example implementations for collecting training data and executing a neural network model. Referring to FIG. 4, the computing device 405 in the example computing environment 400 may include one or more processing units, cores, or processors 410, memory 415 (e.g., RAM, ROM, and/or the like), internal storage 420 (e.g., magnetic, optical, solid state storage, and/or organic), and/or I/O interface 425, any of which may be coupled on a communication mechanism or a bus 430 for communicating information or embedded in the computing device 405.

The computing device 405 may be communicatively coupled to an input/user interface 435 and an output device/interface 440. Either one or both of the input/user interface 435 and the output device/interface 440 may be a wired or wireless interface and may be detachable. The input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). The output device/interface 440 may include a display, television, monitor, printer, speaker, braille, or the like. In some example implementations, the input/user interface 435 and the output device/interface 440 may be embedded with or physically coupled to the computing device 405. In other example implementations, other computing devices may function as or provide the functions of the input/user interface 435 and the output device/interface 440 for the computing device 405.

Examples of the computing device 405 may include, but are not limited to, mobile devices (e.g., tablets, notebooks, laptops, personal computers, portable televisions, radios, and the like), and devices not designed for mobility (e.g., desktop computers, other computers, and the like). The computing device 405 may be communicatively coupled (e.g., via the I/O interface 425) to an external storage device 445 and a network 450 for communicating with any number of networked components, devices, and systems, including one or more computing devices of the same or different configuration. The computing device 405 or any connected computing device may be functioning as, providing services of, or referred to as a server, client, thin server, general machine, special-purpose machine, or another label.

The I/O interface 425 may include, but is not limited to, wired and/or wireless interfaces using any communication or I/O protocols or standards (e.g., Ethernet, 802.11x, Universal system Bus, WiMax, modem, a cellular network protocol, and the like) for communicating information to and/or from at least all the connected components, devices, and network in the computing environment 400. The network 450 may be any network or combination of networks (e.g., the Internet, local area network, wide area network, a telephonic network, a cellular network, satellite network, and the like).

The computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computing device 405 can be used to implement techniques, methods, applications, processes, or computer-executable instructions in some example computing environments. Computer-executable instructions can be retrieved from transitory media, and stored on and retrieved from non-transitory media. The executable instructions may originate from one or more of any programming, scripting, and machine languages (e.g., C, C++, C#, Java, Visual Basic, Python, Perl, JavaScript, and others).

The processor(s) 410 may execute under any operating system (OS) (not shown), in a native or virtual environment. One or more applications may be deployed that include a logic unit 460, an application programming interface (API) unit 465, an input unit 470, an output unit 475, and an inter-unit communication mechanism 495 for the different units to communicate with each other, with the OS, and with other applications (not shown). The processor(s) 410 may further include a neural network processor 480. The neural network processor 480 may include multiple processors operating in parallel. The neural network processor 480 may implement neural networks, for example, but not limited to, Long Short Term Memory (LSTM) neural networks, feed-forward neural network, radial basis function neural network, or other types of neural networks. For example, the neural network processor 480 may be used in an implementation of one or more processes described and/or shown in FIG. 3. The described units and elements can be varied in design, function, configuration, or implementation and are not limited to the descriptions provided.

The processor(s) 410 may further include a central processing unit (CPU) 485. The CPU 485 may be a general-purpose processor operable to access stored software that programs or configures the computing system for implementing one or more aspects of the present disclosure. The CPU 485 may execute instructions under control of different programs originating from one or more programming, scripting, and machine languages. The CPU 485 may communicate with the logic unit 460, the API unit 465, the input unit 470, the output unit 475, and the neural network processor 480 via the inter-unit communication mechanism 495.

In some instances, the logic unit 460 may be configured to control information flow among the units and direct the services provided by the API unit 465, the input unit 470, the output unit 475, and the neural network processor 480 in some example implementations. For example, the flow of one or more processes or implementations may be controlled by the logic unit 460 alone or in conjunction with the API unit 465.

In some implementations, the example computing environment 400 may be or may include a cloud computing platform.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method comprising:
    forming a machine learning model operable on a neural network processor in a computing environment, the machine learning model configured to analyze input data comprising an initial set of attributes to predict analytical capabilities of a set of individuals for performing a specific task;
    operating the neural network processor to execute the machine learning model, wherein the machine learning model generates knowledge score metrics for the set of individuals based at least in part on the initial set of attributes, and wherein the knowledge score metrics quantify a prediction of an analytic capability of each individual in the set of individuals for performing the specific task;
    comparing, by a second processor in the computing environment, the knowledge score metrics to a specified threshold;
    identifying, by the second processor, an additional set of attributes of individuals from the set of individuals having knowledge score metrics exceeding the specified threshold, wherein the additional set of attributes specifically identifies attributes of individuals capable of performing the specific task, wherein at least one attribute of the additional set of attributes is not included in the initial set of attributes used to generate the knowledge score metrics; and providing, as additional training input to the machine learning model, the additional set of attributes.

2. The method of claim 1, wherein the specific task comprises:

analyzing a data set; and based on analyzing the data set, generating metadata labels for data in the data set.

3. The method of claim 1, wherein the initial set of attributes comprises one or more of: demographic data, education data, or data regarding a role within a company, and wherein the initial set of attributes indicates a degree of familiarity with a given data set.

4. The method of claim 1, wherein the set of individuals comprises people within a company that meet a specified minimum criterion.

5. The method of claim 1, wherein the specified threshold for the knowledge score metrics is based on the knowledge score metrics of a seed set of experts.

6. The method of claim 1, further comprising:

requesting individuals having the additional set of attributes to perform metadata labeling of metadata for data in a data set;

assessing an accuracy of the metadata labeling performed by the individuals; and updating the metadata when the accuracy of the metadata labeling is assessed as accurate.

7. The method of claim 1, further comprising:

requesting individuals having the additional set of attributes to perform metadata labeling;

assessing an accuracy of the metadata labeling performed by the individuals; and updating the machine learning model for the individuals having the additional set of attributes, based on the accuracy of the metadata labeling.

8. The method of claim 7, further comprising:

updating the machine learning model by adjusting weights of attributes of at least one of: the initial set of attributes or the additional set of attributes which are determined to be beneficial or less relevant for performing metadata labeling.

9. A non-transitory computer readable medium storing instructions which, when executed by at least one processor, cause the at least one processor to perform operations, the operations comprising:

forming a machine learning model in a computing environment, the machine learning model configured to analyze input data comprising an initial set of attributes to predict analytical capabilities of a set of individuals for performing a specific task;

executing the machine learning model, wherein the machine learning model generates knowledge score metrics for the set of individuals based at least in part on the initial set of attributes, and wherein the knowledge score metrics quantify a prediction of an analytic capability of each individual in the set of individuals for performing the specific task;

comparing, in the computing environment, the knowledge score metrics to a specified threshold;

identifying an additional set of attributes of individuals from the set of individuals having knowledge score metrics exceeding the specified threshold, wherein the additional set of attributes specifically identifies attributes of individuals capable of performing the specific task, wherein at least one attribute of the additional set of attributes is not included in the initial set of attributes used to generate the knowledge score metrics; and providing, as additional training input to the machine learning model, the additional set of attributes.

10. The non-transitory computer readable medium of claim 9, wherein the specific task comprises:

analyzing a data set; and based on analyzing the data set, generating metadata labels for data in the data set.

11. The non-transitory computer readable medium of claim 9, wherein the initial set of attributes comprises one or more of: demographic data, education data, or data regarding a role within a company, and wherein the initial set of attributes indicates a degree of familiarity with a given data set.

12. The non-transitory computer readable medium of claim 9, wherein the set of individuals comprises people within a company that meet a specified minimum criterion.

13. The non-transitory computer readable medium of claim 9, wherein the specified threshold for the knowledge score metrics is based on the knowledge score metrics of a seed set of experts.

14. The non-transitory computer readable medium of claim 9, the operations further comprising:

requesting individuals having the additional set of attributes to perform metadata labeling of metadata for data in a data set;

assessing an accuracy of the metadata labeling performed by the individuals; and updating the metadata when the accuracy of the metadata labeling is assessed as accurate.

15. The non-transitory computer readable medium of claim 9, the operations further comprising:

requesting individuals having the additional set of attributes to perform metadata labeling;

assessing an accuracy of the metadata labeling performed by the individuals; and updating the machine learning model for the individuals having the additional set of attributes based on the accuracy of the metadata labeling.

16. A system comprising:

a memory operable to store a predictive model;

a first processor communicatively coupled to the memory, wherein the first processor is operable to execute the predictive model to perform operations, the operations comprising:

generating knowledge score metrics based on an initial set of attributes for individuals included in a specified population, wherein the knowledge score metrics quantify a prediction of a capability of an individual for performing metadata labeling; and a second processor communicatively coupled to the memory and the first processor, wherein the second processor is operable to perform second operations, the second operations comprising:

comparing the knowledge score metrics to a specified threshold; and identifying an additional set of attributes of individuals from a specified population having knowledge score metrics exceeding the specified threshold, wherein the additional set of attributes specifically identifies attributes of individuals capable of performing metadata labeling, wherein at least one attribute of the additional set of attributes is not included in the initial set of attributes on which the knowledge score metrics are based, wherein the first processor is further for updating the predictive model using the additional set of attributes as new training input.

17. The system of claim 16, wherein the initial set of attributes comprises one or more of: demographic data, education data, or data regarding a role within a company, and wherein the initial set of attributes indicates a degree of familiarity with a given data set.

18. The system of claim 16, wherein the specified threshold for the knowledge score metrics is based on knowledge score metrics of a seed set of experts.

19. The system of claim 16, wherein the second processor is further operable to perform second operations comprising:

generating requests to individuals having the additional set of attributes to perform metadata labeling; and wherein the first processor is further operable to perform operations comprising:

receiving as input an assessment of an accuracy of the metadata labeling performed by the individuals; and updating the predictive model for the individuals having the additional set of attributes based on the accuracy of the metadata labeling.

20. The system of claim 19, wherein the second processor is further operable to perform second operations comprising:

updating the predictive model by adjusting weights of attributes of at least one of: the initial set of attributes or the additional set of attributes which are determined by the predictive model to be beneficial or less relevant for performing metadata labeling.

* * * * *